US010141783B2

(12) United States Patent
Ogawa et al.

(10) Patent No.: US 10,141,783 B2
(45) Date of Patent: Nov. 27, 2018

(54) TRANSMITTING DEVICE, RECEIVING DEVICE, AND POWER TRANSMISSION SYSTEM

(71) Applicant: KABUSHIKI KAISHA TOSHIBA, Tokyo (JP)

(72) Inventors: Kenichirou Ogawa, Kanagawa (JP); Noriaki Oodachi, Kanagawa (JP); Shuichi Obayashi, Kanagawa (JP); Hiroki Shoki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 445 days.

(21) Appl. No.: 14/722,273

(22) Filed: May 27, 2015

(65) Prior Publication Data

US 2016/0006259 A1    Jan. 7, 2016

(30) Foreign Application Priority Data

Jul. 7, 2014   (JP) ................................. 2014-139934

(51) Int. Cl.
*H02J 50/12* (2016.01)
*H02J 7/02* (2016.01)
*H02J 50/10* (2016.01)

(52) U.S. Cl.
CPC .............. *H02J 50/12* (2016.02); *H02J 7/025* (2013.01); *H02J 50/10* (2016.02)

(58) Field of Classification Search
None
See application file for complete search history.

(56) References Cited

U.S. PATENT DOCUMENTS

| 9,312,924 B2 | 4/2016 | Ozaki et al. |
| 9,583,966 B2 | 2/2017 | Kato |

(Continued)

FOREIGN PATENT DOCUMENTS

| JP | 2012-44827 | 3/2012 |
| JP | 2012-517792 | 8/2012 |
| JP | 2013-85350 | 5/2013 |

(Continued)

*Primary Examiner* — Thienvu Tran
*Assistant Examiner* — David M Stables
(74) *Attorney, Agent, or Firm* — Finnegan, Henderson, Farabow, Garrett & Dunner, L.L.P.

(57) ABSTRACT

A power transmission system according to an embodiment includes a transmitting device and a receiving device. The transmitting (receiving) device includes a transmitting (receiving) housing and a transmitting (receiving) coil. The transmitting (receiving) housing includes a first transmitting (receiving) surface and a second transmitting (receiving) surface. The transmitting (receiving) coil includes a first transmitting (receiving) part and a second transmitting (receiving) part. A first facing area and a second facing area at the reference position are set such that change of strength of magnetic coupling between the transmitting coil and the receiving coil of when the receiving device is moved in a direction perpendicular to the first transmitting surface becomes smaller than change of strength of magnetic coupling between the transmitting coil and the receiving coil of when the receiving device is moved in a direction perpendicular to the second transmitting surface.

13 Claims, 14 Drawing Sheets

(56) References Cited

U.S. PATENT DOCUMENTS 9,620,985 B2* 4/2017 Rosenfeld ............... H02J 7/025
2015/0332847 A1* 11/2015 Omori ..................... H01F 38/14
307/104

FOREIGN PATENT DOCUMENTS

| JP | 2013-223283 | 10/2013 | | |
|----|----|----|----|----|
| JP | 2014-132808 | 7/2014 | | |
| WO | WO 2013/051361 | 4/2013 | | |
| WO | WO 2014119297 A1 * | 8/2014 | ............. | H01F 38/14 |

* cited by examiner

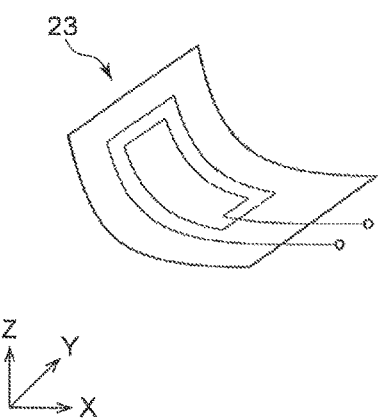
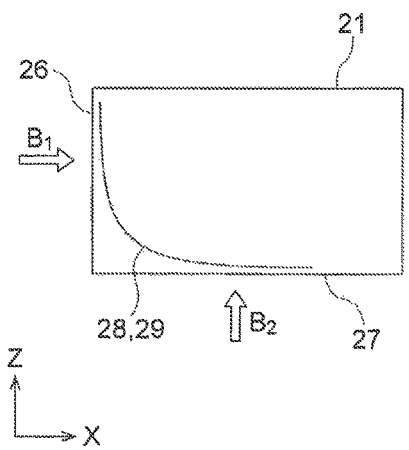
FIG. 10A  FIG. 10B
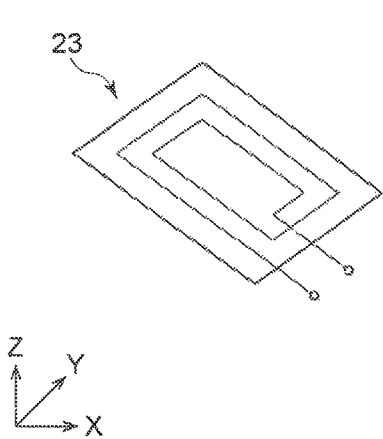
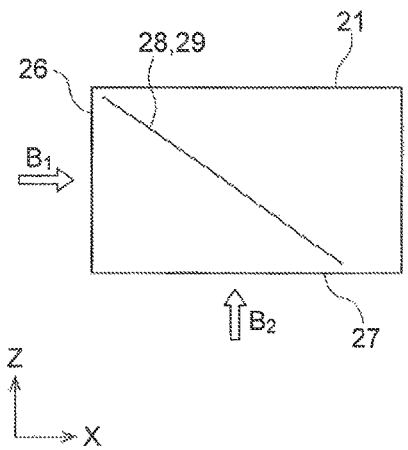
FIG. 11A  FIG. 11B

| z(mm) | 23a(40×60) | | | 23b(50×50) | | | 23c(60×40) | | |
|---|---|---|---|---|---|---|---|---|---|
| | Mmin | Mmax | FLUCTUATION RANGE(%) | Mmin | Mmax | FLUCTUATION RANGE(%) | Mmin | Mmax | FLUCTUATION RANGE(%) |
| 20~60 | 0.329 | 0.459 | ±16.5 | 0.291 | 0.448 | ±21.3 | 0.237 | 0.429 | ±28.9 |
| 25~60 | 0.329 | 0.436 | ±14.0 | 0.291 | 0.445 | ±21.0 | 0.237 | 0.429 | ±28.9 |
| 30~60 | 0.329 | 0.424 | ±12.6 | 0.291 | 0.440 | ±20.4 | 0.237 | 0.425 | ±28.4 |
| 40~60 | 0.329 | 0.407 | ±10.6 | 0.291 | 0.410 | ±17.0 | 0.237 | 0.384 | ±23.8 |

FIG. 23

TRANSMITTING DEVICE, RECEIVING DEVICE, AND POWER TRANSMISSION SYSTEM

CROSS REFERENCE TO RELATED APPLICATION(S)

This application is based upon and claims the benefit of priority from the prior Japanese Patent Application No 2014-139934, filed on Jul. 7, 2014, the entire contents of which are incorporated herein by reference.

FIELD

Embodiments described herein relate generally to a transmitting device, a receiving device, and a power transmission system.

BACKGROUND

In recent years, power transmission systems that contactlessly transmit power from a transmitting device to a receiving device using an electromagnetic induction system or a magnetic field resonance system have become popular. In these power transmission systems, power transmission efficiency is changed depending on the distance or positional relationship between a transmitting coil and a receiving coil. Therefore, in transmitting the power, there is a problem of a decrease in the power transmission efficiency if position gap is caused between the transmitting coil and the receiving coil.

BRIEF DESCRIPTION OF THE DRAWINGS

FIG. 10A is a perspective view illustrating an example of a receiving coil, and FIG. 10B is an XZ plane cross sectional view of the receiving device;

FIG. 11A is a perspective view illustrating an example of a receiving coil, and FIG. 11B is an XZ plane cross sectional view of the receiving device;

FIG. 23 is a table illustrating fluctuation ranges of the mutual inductances of FIG. 22.

DETAILED DESCRIPTION

Embodiments will now be explained with reference to the accompanying drawings. The present invention is not limited to the embodiments.

A power transmission system according to an embodiment includes a transmitting device and a receiving device. The transmitting device includes a transmitting housing and a transmitting coil. The transmitting housing includes a first transmitting surface and a second transmitting surface inclined with respect to the first transmitting surface. The transmitting coil includes a first transmitting part arranged in the transmitting housing at a side of the first transmitting surface and a second transmitting part arranged in the transmitting housing at a side of the second transmitting surface. The receiving device includes a receiving housing and a receiving coil. The receiving housing includes a first receiving surface and a second receiving surface inclined with respect to the first receiving surface. The receiving coil includes a first receiving part arranged in the receiving housing at a side of the first receiving surface and a second receiving part arranged in the receiving housing at a side of the second receiving surface. A reference position of the receiving coil with respect to the transmitting coil at the time of power transmission is set such that the first receiving part and the first transmitting part face each other, and the second receiving part and the second transmitting part face each other. A first facing area between the first receiving part and the first transmitting part at the reference position and a second facing area between the second receiving part and the second transmitting part at the reference position are set such that change of strength of magnetic coupling between the transmitting coil and the receiving coil of when the receiving device is moved in a direction perpendicular to the first transmitting surface becomes smaller than change of strength of magnetic coupling between the transmitting coil and the receiving coil of when the receiving device is moved in a direction perpendicular to the second transmitting surface.

Configuration of Power Transmission System

Figure 1:
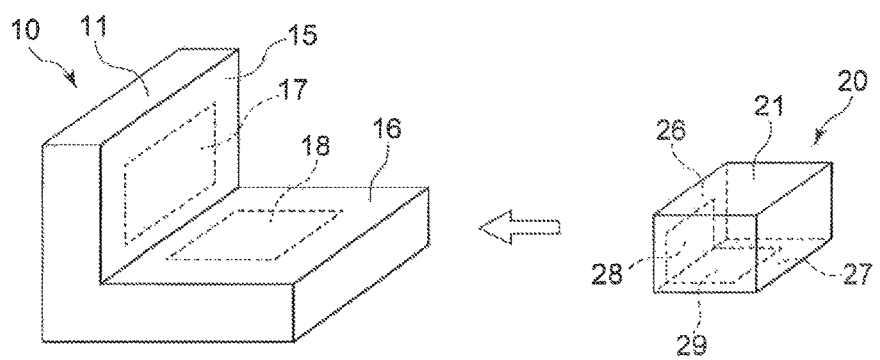
FIG. 1 is a perspective view illustrating a schematic configuration of a power transmission system according to an embodiment.
Figure 1:
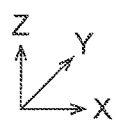

Configurations of a transmitting device, a receiving device, and a power transmission system according to an embodiment will be described with reference to FIGS. 1 to 23. The power transmission system according to the present embodiment contactlessly transmits power from the transmitting device to the receiving device using a magnetic field resonance system or an electromagnetic induction system. FIG. 1 is a perspective view illustrating a schematic configuration of the power transmission system according to the present embodiment. Hereinafter, a lateral direction in the perspective view of FIG. 1 is an X direction, a depth direction is a Y direction, and a longitudinal direction is a Z direction. As illustrated in FIG. 1, the power transmission system includes a transmitting device 10 and a receiving device 20.

Configuration of Transmitting Device

Figure 2:
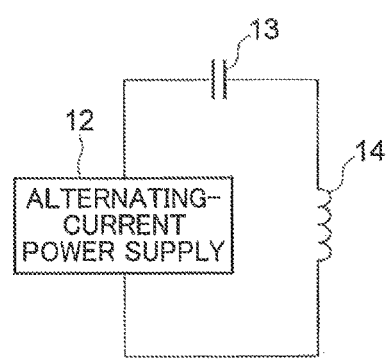
FIG. 2 is a diagram illustrating a circuit configuration of a transmitting device.

First of all, a configuration of the transmitting device 10 will be described. The transmitting device 10 contactlessly transmits power to the receiving device 20. Here, FIG. 2 is a diagram illustrating a circuit configuration of the transmitting device 10. As illustrated in FIGS. 1 and 2, the transmitting device 10 includes a transmitting housing 11, an alternating-current power supply 12, a capacitor 13, and a transmitting coil 14.

The transmitting housing 11 is a main body of the transmitting device 10. The transmitting housing 11 includes a first transmitting surface 15 and a second transmitting surface 16 inclined with respect to the first transmitting surface 15. Both of the first transmitting surface 15 and the second transmitting surface 16 are surfaces of the housing 11, and intersect with each other, sharing one side. In FIG. 1, the second transmitting surface 16 is perpendicular to the first transmitting surface 15. However, the embodiment is not limited thereto, and the second transmitting surface 16 can intersect with the first transmitting surface 15 at an arbitrary angle. In transmitting the power to the receiving device 20, the receiving device 20 is placed on at least one of the first transmitting surface 15 and the second transmitting surface 16.

The alternating-current power supply 12 generates power having a predetermined frequency, and supplies the power to the capacitor 13 and the transmitting coil 14. The alternating-current power supply 12 is provided inside or outside the transmitting housing 11. The alternating-current power supply 12 includes an oscillation circuit and a power amplifier circuit. The alternating-current power supply 12 is supplied direct-current power from a direct-current power supply provided outside the transmitting housing 11, and generates alternating-current power having a desired frequency with the oscillation circuit. The alternating-current power supply 12 then amplifies the generated alternating-current power with the power amplifier circuit, and supplies the power to the capacitor 13 and the transmitting coil 14. Note that the alternating-current power supply 12 may be a switching power supply.

The capacitor 13 is arranged inside the transmitting housing 11, and forms a resonance circuit together with the transmitting coil 14. A resonance frequency of the resonance circuit approximately accords with the frequency of the alternating-current power supply 12. In FIG. 2, the capacitor 13 is connected with the transmitting coil 14 in series to configure a series resonance circuit. However, the capacitor 13 may be connected with the transmitting coil 14 in parallel to configure a parallel resonance circuit. Further, as the capacitor 13, a capacitive element may be used, or a line capacity of the transmitting coil 14 or the like may be used.

The transmitting coil 14 is a plane coil that is arranged inside the transmitting housing 11 and forms the resonance circuit together with the capacitor 13. The transmitting coil 14 may be a plane coil made of copper wire, aluminum wire, litz wire, or the like, or may be a printed coil formed on a surface of a rigid or flexible printed circuit board. In any case, the transmitting coil 14 includes a first transmitting part 17 and a second transmitting part 18.

The first transmitting part 17 is a portion of the transmitting coil 14 arranged in the transmitting housing 11 at the side of the first transmitting surface 15 in the transmitting coil 14. The portion of the transmitting coil 14 arranged in the transmitting housing 11 at the side of the first transmitting surface 15 refers to a portion of the transmitting coil 14 where an orthographic projection is formed on the first transmitting surface 15 of the transmitting housing 11. The orthographic projection referred here is a projection of the transmitting coil 14 projected from a direction perpendicular to the first transmitting surface 15.

The first transmitting part 17 of the transmitting coil 14 transmits the power to the receiving device 20 through the first transmitting surface 15 of the transmitting housing 11. Therefore, a transmitting direction of the first transmitting part 17 is a direction from the first transmitting part 17 toward the first transmitting surface 15.

The second transmitting part 18 is a portion of the transmitting coil 14 arranged in the transmitting housing 11 at the side of the second transmitting surface 16 in the transmitting coil 14. The portion of the transmitting coil 14 arranged in the transmitting housing 11 at the side of the second transmitting surface 16 refers to a portion of the transmitting coil 14 where an orthographic projection is formed on the second transmitting surface 16 of the transmitting housing 11. The orthographic projection referred here is a projection of the transmitting coil 14 projected from a direction perpendicular to the second transmitting surface 16.

The second transmitting part 18 of the transmitting coil 14 transmits the power to the receiving device 20 through the second transmitting surface 16 of the transmitting housing 11. Therefore, a transmitting direction of the second transmitting part 18 is a direction from the second transmitting part 18 toward the second transmitting surface 16.

Figure 3A:
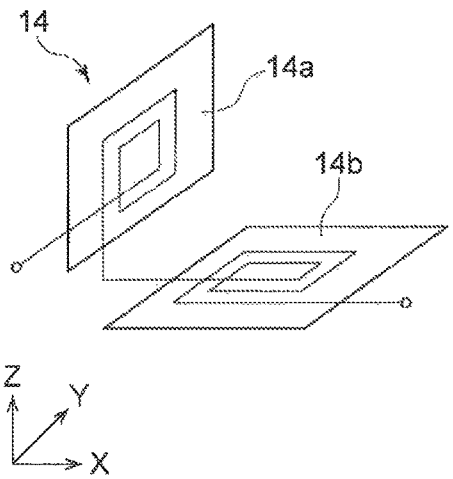
FIG. 3A is a perspective view illustrating an example of a transmitting coil.
Figure 3B:
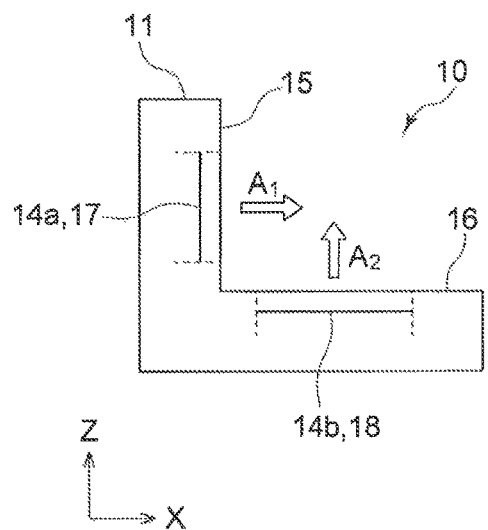
FIG. 3B is an XZ plane cross sectional view of the transmitting device.

Here, FIG. 3A is a perspective view illustrating an example of the transmitting coil 14. Further, FIG. 3B is an XZ plane cross sectional view of the transmitting device 10 including the transmitting coil 14 of FIG. 3A. The transmitting coil 14 of FIG. 3A is formed of two plane coils 14a and 14b that are electrically connected such that phases of magnetic fields in the transmitting direction accord with each other.

As illustrated in FIG. 3B, the plane coil 14a is arranged in the transmitting housing 11 at the side of the first transmitting surface 15. That is, the orthographic projection of the plane coil 14a is formed on the first transmitting surface 15. Therefore, in the transmitting coil 14, the first transmitting part 17 is the plane coil 14a. In FIG. 3B, the arrow $A_1$ indicates the transmitting direction of the first transmitting part 17.

As illustrated in FIG. 3B, the plane coil 14b is arranged in the transmitting housing 11 at the side of the second transmitting surface 16. That is, the orthographic projection of the plane coil 14b is formed on the second transmitting surface 16. Therefore, in the transmitting coil 14, the second transmitting part 18 is the plane coil 14b. In FIG. 3B, the arrow $A_2$ indicates the transmitting direction of the second transmitting part 18.

As illustrated in FIG. 3B, the plane coils 14a and 14b are arranged such that the first transmitting part 17 and the second transmitting part 18 are perpendicular to each other. However, the embodiment is not limited to the arrangement, and the plane coils 14a and 14b can be arranged such that the first transmitting part 17 and the second transmitting part 18 intersect at an arbitrary angle.

Note that the plane coil 14a may include a portion not arranged in the transmitting housing 11 at the side of the first transmitting surface 15. In this case, the portion of the plane coil 14a arranged in the transmitting housing 11 at the side of the first transmitting surface 15 becomes the first transmitting part 17. Similarly, the plane coil 14b may include a portion not arranged in the transmitting housing 11 at the side of the second transmitting surface 16. In this case, the portion of the plane coil 14b arranged in the transmitting housing 11 at the side of the second transmitting surface 16 becomes the second transmitting part 18.

Figure 4A:
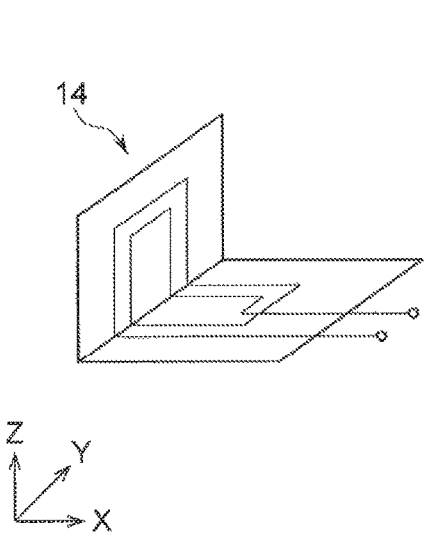
FIG. 4A is a perspective view illustrating an example of a transmitting coil.
Figure 4B:
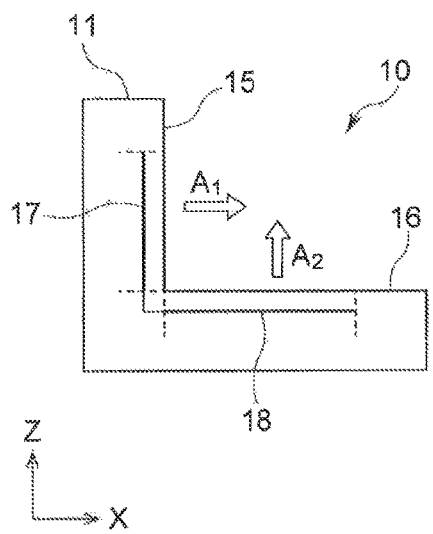
FIG. 4B is an XZ plane cross sectional view of the transmitting device.

FIG. 4A is a perspective view illustrating another example of the transmitting coil 14. Further, FIG. 4B is an XZ plane cross sectional view of the transmitting device 10 including the transmitting coil 14 of FIG. 4A. The transmitting coil 14 of FIG. 4A is formed of one bent plane coil.

In the transmitting coil 14, as illustrated in FIG. 4B, a part of one side surface of a polygonal line of the bent transmitting coil 14 becomes the first transmitting part 17, and a part of the other side surface becomes the second transmitting part 18. In FIG. 4B, the first transmitting part 17 and the second transmitting part 18 are illustrated by the bold lines.

Figure 5A:
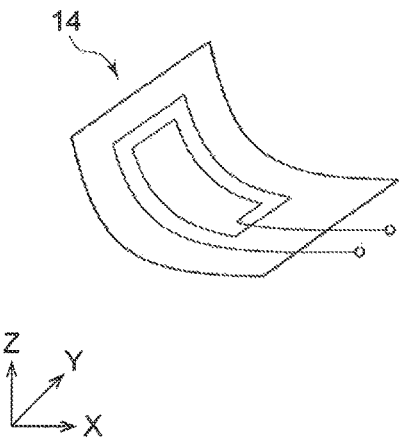
FIG. 5A is a perspective view illustrating an example of a transmitting coil.
Figure 5B:
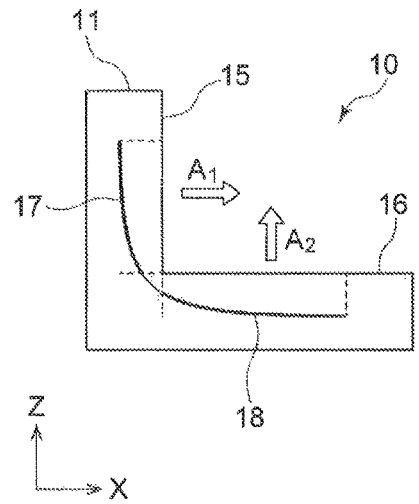
FIG. 5B is an XZ plane cross sectional view of the transmitting device.

FIG. 5A is a perspective view illustrating another example of the transmitting coil 14. Further, FIG. 5B is an XZ plane cross sectional view of the transmitting device 10 including the transmitting coil 14 of FIG. 5A. The transmitting coil 14 of FIG. 5A is formed of one curved plane coil.

In the transmitting coil 14, as illustrated in FIG. 5B, a part of the curved transmitting coil 14 becomes the first transmitting part 17, and another part becomes the second transmitting part 18. In FIG. 5B, the first transmitting part 17 and the second transmitting part 18 are illustrated by the bold lines.

Figure 6A:
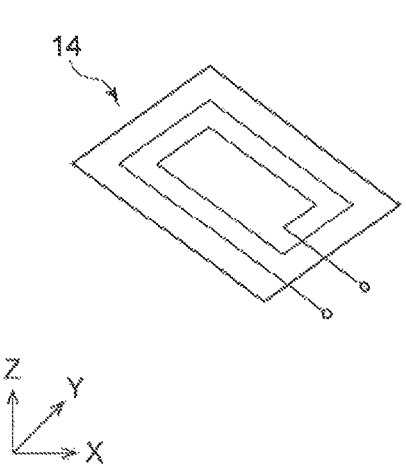
FIG. 6A is a perspective view illustrating an example of a transmitting coil.
Figure 6B:
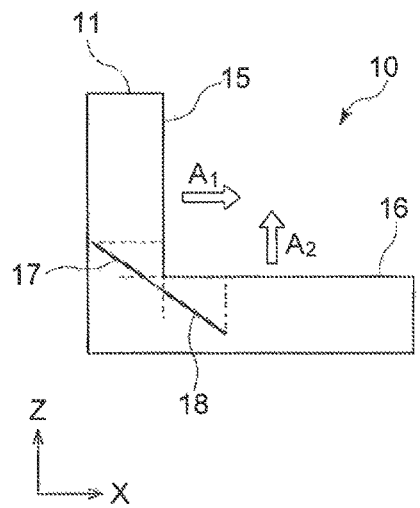
FIG. 6B is an XZ plane cross sectional view of the transmitting device.

FIG. 6A is a perspective view illustrating another example of the transmitting coil 14. Further, FIG. 6B is an XZ plane cross sectional view of the transmitting device 10 including the transmitting coil 14 of FIG. 6A. The transmitting coil 14 of FIG. 6A is formed of one flat plane coil.

In the transmitting coil 14, as illustrated in FIG. 6B, a part of the flat transmitting coil 14 becomes the first transmitting part 17, and another part becomes the second transmitting part 18. In FIG. 6B, the first transmitting part 17 and the second transmitting part 18 are illustrated by the bold lines.

Configuration of Receiving Device

Figure 7:
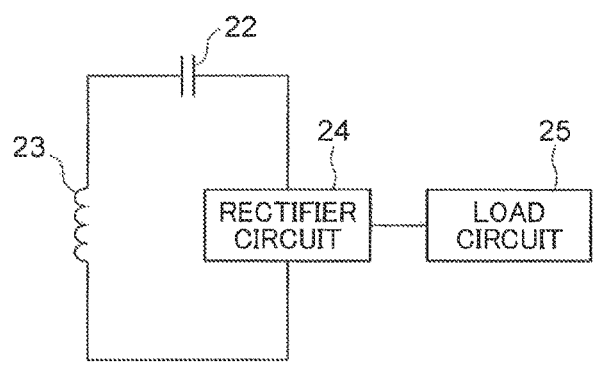
FIG. 7 is a diagram illustrating a circuit configuration of a receiving device.

Next, a configuration of the receiving device 20 will be described. The receiving device 20 contactlessly receives the power from the transmitting device 10. Here, FIG. 7 is a diagram illustrating a circuit configuration of the receiving device 20. As illustrated in FIGS. 1 and 7, the receiving device 20 includes a receiving housing 21, a capacitor 22, a receiving coil 23, a rectifier circuit 24, and a load circuit 25.

The receiving housing 21 is a main body of the receiving device 20. The receiving housing 21 includes a first receiving surface 26 and a second receiving surface 27 inclined with respect to the first receiving surface 26. Both of the first receiving surface 26 and the second receiving surface 27 are surfaces of the housing 21, and intersect with each other, sharing one side. In FIG. 1, the second receiving surface 27 is perpendicular to the first receiving surface 26. However, the embodiment is not limited thereto, and the second receiving surface 27 can intersect with the first receiving surface 26 at an arbitrary angle. In receiving the power from the transmitting device 10, the receiving device 20 is placed on at least one of the first transmitting surface 15 and the second transmitting surface 16. At this time, the receiving device 20 is arranged such that the first receiving surface 26 faces the first transmitting surface 15 of the transmitting device 10, and the second receiving surface 27 faces the second transmitting surface 16 of the transmitting device 10.

The capacitor 22 is arranged inside the receiving housing 21, and forms a resonance circuit together with the receiving coil 23. A resonance frequency of the resonance circuit approximately accord with the frequency of the resonance circuit of the transmitting device 10. In FIG. 7, the capacitor 22 is connected with the receiving coil 23 in series to configure a series resonance circuit. However, the capacitor 22 may be connected with the receiving coil 23 in parallel to configure a parallel resonance circuit. Further, as the capacitor 22, a capacitive element may be used, or a line capacity of the receiving coil 23 or the like may be used.

The receiving coil 23 is a plane coil that is arranged inside the receiving housing 21, and forms the resonance circuit together with the capacitor 22. The receiving coil 23 may be a plane coil made of copper wire, aluminum wire, litz wire, or the like, or may be a printed coil formed on a surface of a rigid or flexible printed circuit board. In any case, the receiving coil 23 includes a first receiving part 28 and a second receiving part 29.

The first receiving part 28 is a portion of the receiving coil 23 arranged in the receiving housing 21 at the side of the first receiving surface 26 in the receiving coil 23. The portion of the receiving coil 23 arranged in the receiving housing 21 at the side of the first receiving surface 26 refers to a portion of the receiving coil 23 where an orthographic projection is formed on the first receiving surface 26 of the receiving housing 21. The orthographic projection referred here is a projection of the receiving coil 23 projected from a direction perpendicular to the first receiving surface 26.

The first receiving part 28 of the receiving coil 23 receives the power from the transmitting device 10 through the first receiving surface 26 of the receiving housing 21 in the receiving coil 23. Therefore, a receiving direction of the first receiving part 28 is a direction from the first receiving surface 26 toward the first receiving part 28.

The second receiving part 29 is a portion of the receiving coil 23 arranged in the receiving housing 21 at the side of the second receiving surface 27 in the receiving col 23. The portion of the receiving coil 23 arranged in the receiving housing 21 at the side of the second receiving surface 27 refers to a portion of the receiving coil 23 where an orthographic projection is formed on the second receiving surface 27 of the receiving housing 21. The orthographic projection referred here is a projection of the receiving coil 23 projected from a direction perpendicular to the second receiving surface 27.

The second receiving part 29 of the receiving coil 23 receives the power from the transmitting device 10 through the second receiving surface 27 of the receiving housing 21. Therefore, the receiving direction of the second receiving part 29 is a direction from the second receiving surface 27 toward the second receiving part 29.

Figure 8A:
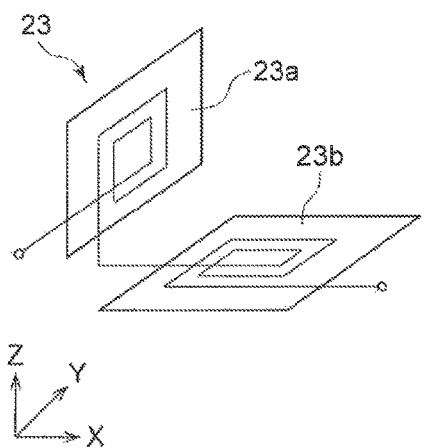
FIG. 8A is a perspective view illustrating an example of a receiving coil.
Figure 8B:
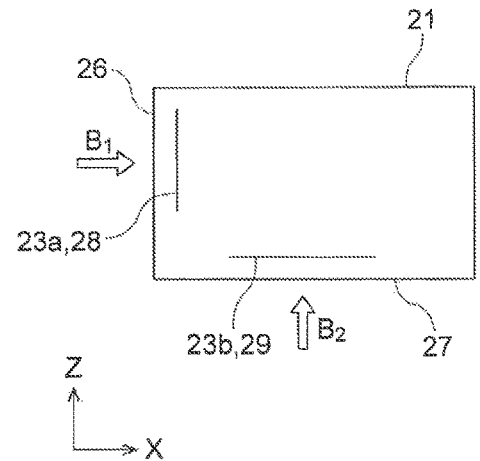
FIG. 8B is an XZ plane cross sectional view of the receiving device.

Here, FIG. 8A is a perspective view illustrating an example of the receiving coil 23. Further, FIG. 8B is an XZ plane cross sectional view of the receiving device 20 including the receiving coil 23 of FIG. 8A. The receiving coil 23 of FIG. 8A is formed of two plane coils 23a and 23b that are electrically connected such that phases of magnetic fields in the receiving direction accord with each other.

As illustrated in FIG. 8B, the plane coil 23a is arranged in the receiving housing 21 at the side of the first receiving surface 26. That is, the orthographic projection of the plane coil 23a is formed on the first receiving surface 26. Therefore, in the receiving coil 23, the first receiving part 28 is the plane coil 23a. In FIG. 8B, the arrow $B_1$ indicates the receiving direction of the first receiving part 28.

As illustrated in FIG. 8B, the plane coil 23b is arranged in the receiving housing 21 at the side of the second receiving surface 27. That is, the orthographic projection of the plane coil 23b is formed on the second receiving surface 27. Therefore, in the receiving coil 23, the second receiving part 29 is the plane coil 23b. In FIG. 8B, the arrow $B_2$ indicates the transmitting direction of the second receiving part 29.

As illustrated in FIG. 8B, the plane coils 23a and 23b are arranged such that the first receiving part 28 and the second receiving part 29 are perpendicular to each other. However, the arrangement is not limited thereto, and the plane coils 23a and 23b can be arranged such that the first receiving part 28 and the second receiving part 29 intersect at an arbitrary angle.

Figure 9A:
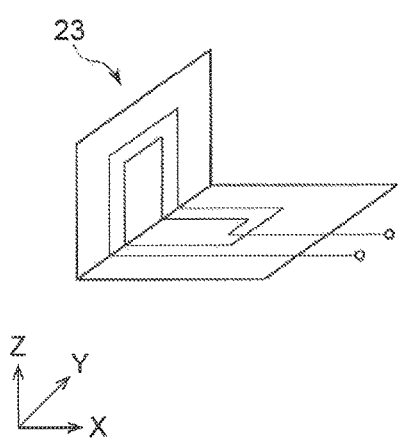
FIG. 9A is a perspective view illustrating an example of a receiving coil.
Figure 9B:
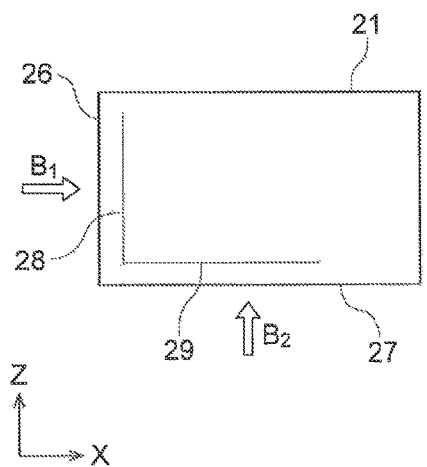
FIG. 9B is an XZ plane cross sectional view of the receiving device.

FIG. 9A is a perspective view illustrating another example of the receiving coil 23. Further, FIG. 9B is an XZ plane cross sectional view of the receiving device 20 including the receiving coil 23 of FIG. 9A. The receiving coil 23 of FIG. 9A is formed of one bent plane coil.

As illustrated in FIG. 9B, in the receiving coil 23, one side surface of a polygonal line of the bent receiving coil 23 becomes the first receiving part 28, and the other side surface becomes the second receiving part 29.

FIG. 10A is a perspective view illustrating another example of the receiving coil 23. Further, FIG. 10B is an XZ plane cross sectional view of the receiving device 20 including the receiving coil 23 of FIG. 10A. The receiving coil 23 of FIG. 10A is formed of one curved plane coil.

As illustrated in FIG. 10B, in the receiving coil 23, the entire curved receiving coil 23 becomes the first receiving part 28 and the second receiving part 29. That is, the first receiving part 28 and the second receiving part 29 accord with each other.

FIG. 11A is a perspective view illustrating another example of the receiving coil 23. Further, FIG. 11B is an XZ plane cross sectional view of the receiving device 20 including the receiving coil 23 of FIG. 11A. The receiving coil 23 of FIG. 11A is formed of one flat plane coil.

As illustrated in FIG. 11B, in the receiving coil 23, the entire flat receiving coil 23 becomes the first receiving part 28 and the second receiving part 29. That is, the first receiving part 28 and the second receiving part 29 accord with each other.

The rectifier circuit 24 converts the alternating-current power received through the resonance circuit made of the capacitor 22 and the receiving coil 23 into direct-current power. The rectifier circuit 24 can be configured from an inverter circuit.

The load circuit 25 is a circuit of electronic equipment included in the receiving device 20. The direct-current power rectified by the rectifier circuit 24 is used for the operation of the load circuit 25 and charging of a battery built in the electronic equipment. When the load circuit 25 can be operated with the alternating-current power, the receiving device 20 can have a configuration without including the rectifier circuit 24.

Operation of Power Transmission System

Figure 12:
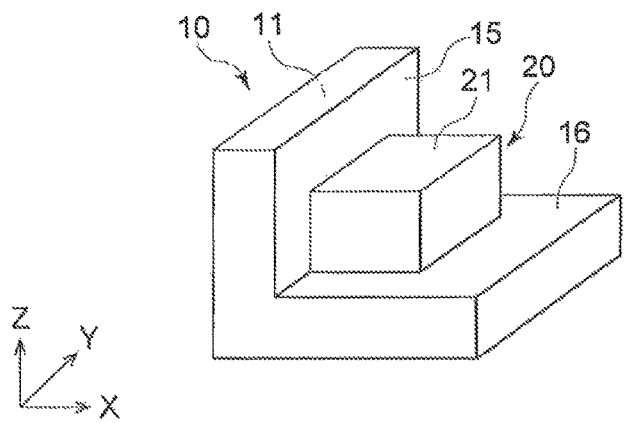
FIG. 12 is a perspective view illustrating a schematic configuration of the power transmission system at the time of power transmission.
Figure 13:
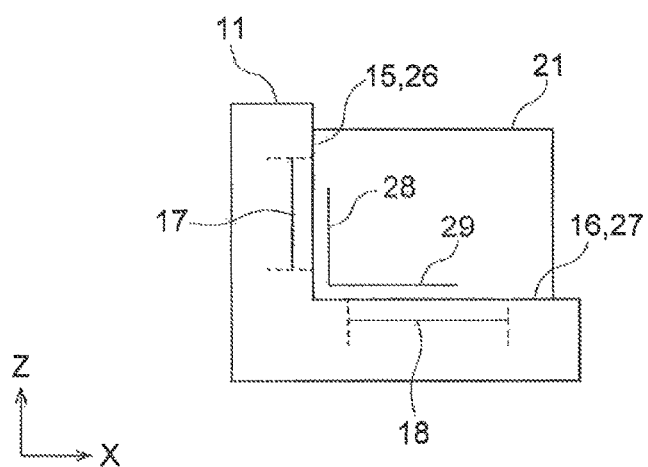
FIG. 13 is an XZ plane cross sectional view of the power transmission system of FIG. 12.

Next, an operation of the power transmission system according to the present embodiment will be described with reference to FIGS. 12 to 23. FIG. 12 is a perspective view illustrating the power transmission system at the time of power transmission. Further, FIG. 13 is an XZ plane cross sectional view of FIG. 12.

In the description below, the transmitting device 10 includes the transmitting coil 14 made of the two plane coils 14a and 14b, and the receiving device 20 includes the receiving coil 23 made of one bent plane coil. However, the combination of the transmitting coil 14 and the receiving coil 23 is not limited to thereto, and any combination can be selected from among the above-described shapes of the transmitting coil 14 and the receiving coil 23.

In the power transmission system, as illustrated in FIG. 12, the power transmission is performed in a state where the receiving device 20 is arranged at a reference position on the transmitting device 10. The reference position is a position determined in advance, as a position of the receiving coil 23 with respect to the transmitting coil 14 at the time of power transmission.

The reference position is set such that the first transmitting part 17 of the transmitting coil 14 and the first receiving part 28 of the receiving coil 23 face each other. That is, the reference position is set such that the first transmitting surface 15 of the transmitting housing 11 and the first receiving surface 26 of the receiving housing 21 face each other. Therefore, when the receiving device 20 is arranged at the reference position, the power transmission from the first transmitting part 17 to the first receiving part 28 becomes possible.

As illustrated in FIG. 13, it is favorable to set the reference position such that the first transmitting surface 15 of the transmitting housing 11 and the first receiving surface 26 of the receiving housing 21 come in contact with each other. For example, the reference position is set such that a total of a distance between the first transmitting part 17 and the first receiving part 28, and a distance between the second transmitting part 18 and the second receiving part 29 is minimized. Accordingly, the distance between the first transmitting part 17 and the first receiving part 28 can be made small, and the power transmission efficiency between the first transmitting part 17 and the first receiving part 28 can be improved.

Further, the reference position is set such that the second transmitting part 18 of the transmitting coil 14 and the second receiving part 29 of the receiving coil 23 face each other. That is, the reference position is set such that the second transmitting surface 16 of the transmitting housing 11 and the second receiving surface 27 of the receiving housing 21 face each other. Therefore, when the receiving device 20 is arranged at the reference position, the power transmission from the second transmitting part 18 to the second receiving part 29 becomes possible.

As illustrated in FIG. 13, the reference position is favorably set such that the second transmitting surface 16 of the transmitting housing 11 and the second receiving surface 27 of the receiving housing 21 come in contact with each other. Accordingly, the distance between the second transmitting part 18 and the second receiving part 29 is decreased, and the power transmission efficiency between the second transmitting part 18 and the second receiving part 29 can be improved.

When the power is transmitted, the receiving device 20 is arranged on the transmitting device 10 such that the receiving coil 23 is arranged at the reference position. Under this state, when the alternating-current power supply 12 of the transmitting device 10 supplies the alternating-current power to the resonance circuit made of the capacitor 13 and the transmitting coil 14, the transmitting coil 14 generate an alternating magnetic field.

The receiving coil 23 is magnetically coupled with the transmitting coil 14 through the alternating magnetic field, and an alternating current flows in the resonance circuit of the receiving device 20, which is made of the capacitor 22 and the receiving coil 23. The rectifier circuit 24 of the receiving device 20 converts the alternating current flowing in the resonance circuit into a direct current, and the converted direct current is supplied to the load circuit 25. Accordingly, the power transmission from the transmitting device 10 to the receiving device 20 is realized.

In the power transmission system, there is a concern that the receiving coil 23 is arranged at a position deviated from the reference position in the power transmission, due to the position gap of the receiving device 20 arranged on the transmitting device 10 or design errors of the transmitting device 10 and the receiving device 20. However, the power transmission system can suppress a decrease in the power transmission efficiency even if such position gap of the receiving coil 23 is caused. Reasons will be given in the description below.

Figure 14:
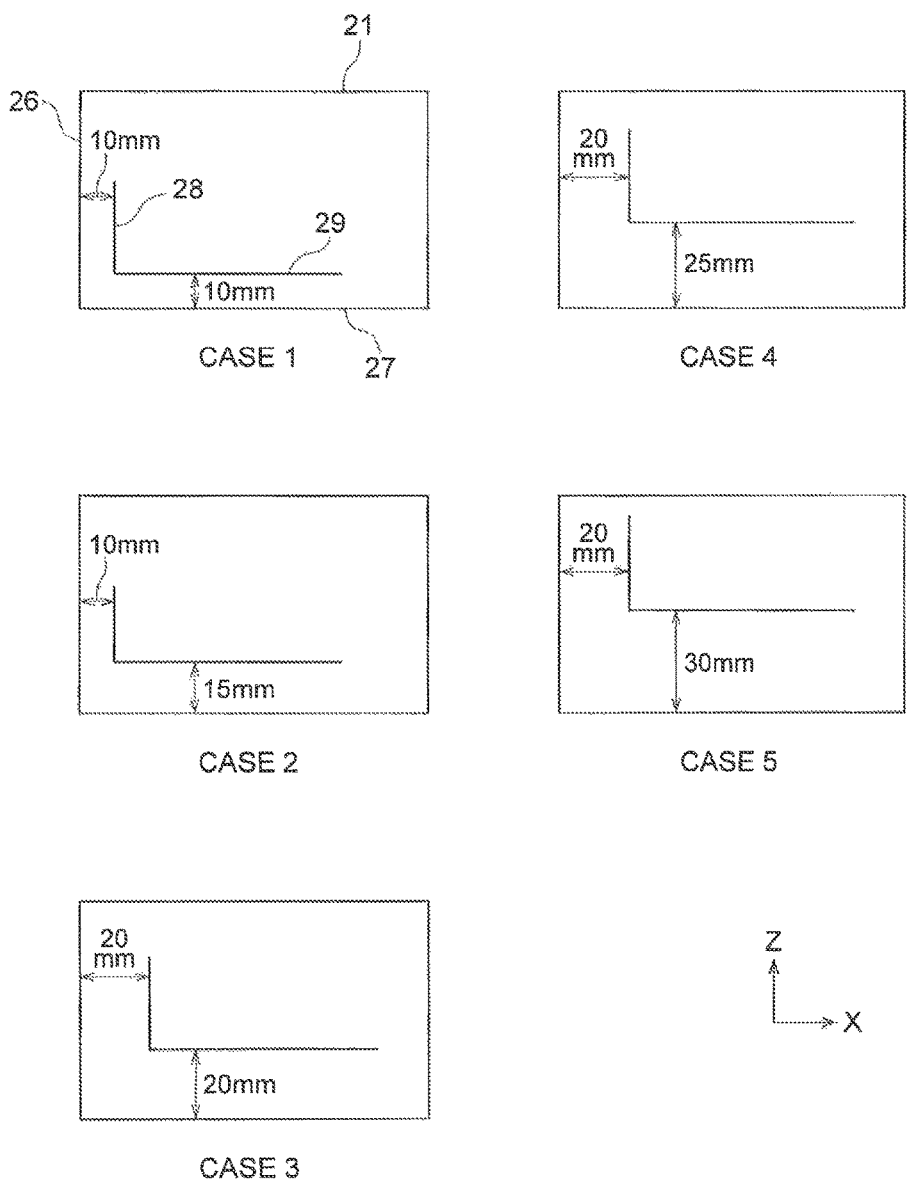
FIG. 14 is XZ plane cross sectional views of receiving devices in which arrangements of the receiving coils are different from one another.

Here, as illustrated in FIG. 14, consider five cases in which the positions of the receiving coils 23 in the receiving housings 21 of the receiving devices 20 are different. In the cases of FIG. 14, the positions where the receiving coils 23 are arranged in the receiving devices 20 are different. Therefore, when the receiving devices 20 of the respective cases are arranged at the same position on the transmitting devices 10, the positions of the receiving coils 23 with respect to the transmitting coils 14 are different in the cases. This assumes a situation in which the position gap of the receiving coil 23 is caused due to a design error of the receiving device 20. For example, when the position of the receiving coil 23 with respect to the transmitting coil 14 in Case 3 is the reference position, the position gap of the receiving coil 23 is caused in Cases 1, 2, 4, and 5.

In the cases of FIG. 14, when the distance between the first receiving surface 26 and the first receiving part 28 is a first distance, and the distance between the second receiving surface 27 and the second receiving part 29 is a second distance, the first distance is 10 mm and the second distance is 10 mm in Case 1. The first distance is 10 mm and the second distance is 15 mm in Case 2. The first distance is 20 mm and the second distance is 20 mm in Case 3. The first distance is 20 mm and the second distance is 25 mm in Case 4. The first distance is 20 mm and the second distance is 30 mm in Case 5.

Figure 15:
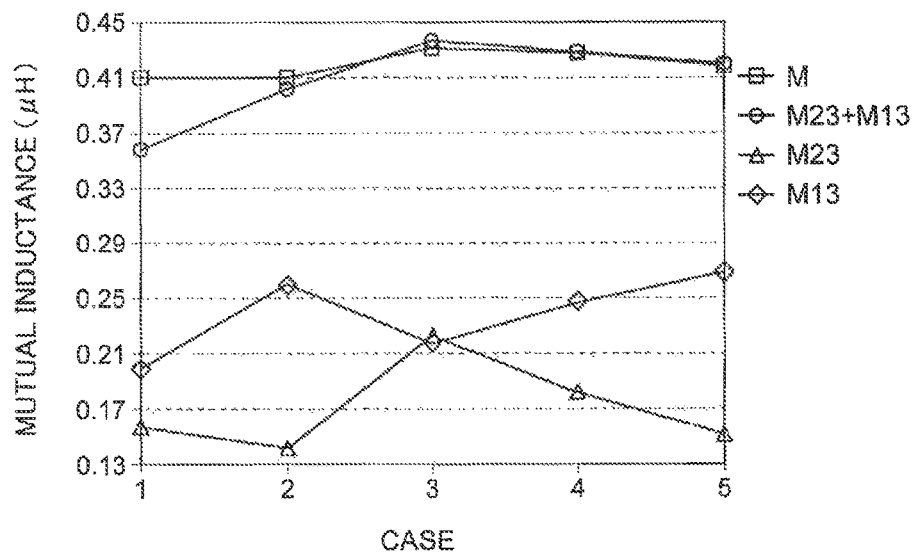
FIG. 15 is a graph illustrating mutual inductances of power transmission systems having the receiving devices of FIG. 14.

FIG. 15 is a graph illustrating mutual inductances (μH) between the transmitting coils 14 and the receiving coils 23 in the respective cases. The mutual inductance is a parameter indicating strength of magnetic coupling between the transmitting coil 14 and the receiving coil 23. Note that similar discussion is established even when a coupling coefficient k is used instead of the mutual inductance.

In FIG. 15, a mutual inductance M between the transmitting device 10 and the receiving device 20, a mutual inductance M13 between the first transmitting part 17 and the first receiving part 28, a mutual inductance M23 between the second transmitting part 18 and the second receiving part 29, and a total value M13+M23 of the mutual inductances M13 and M23 are illustrated.

The mutual inductances M13 and M23 are values measured such that the plane coils 14a and 14b of the transmitting coil 14 are separated for the sake of convenience. This is because, if the mutual inductance is measured in a state where the plane coils 14a and 14b are connected, the magnetic fields generated by the plane coils 14a and 14b interfere with each other and individual mutual inductance cannot be measured. That is, the mutual inductance M13 is a mutual inductance between the plane coil 14a and the first receiving part 28 measured in a state where the plane coil 14b does not generate the magnetic field. Further, the mutual inductance M23 is a mutual inductance between the plane coil 14b and the second receiving part 29 measured in a state where the plane coil 14a does not generate the magnetic field.

According to FIG. 15, the mutual inductance M between the transmitting coil 14 and the receiving coil 23 is approximately equal to the mutual inductance M13+M23 (M≈M13+M23). This indicates that the mutual inductance M is a sum of the mutual inductance M13 and the mutual inductance M23.

Further, according to FIG. 15, the mutual inductance M has small change according to the position gap of the receiving coil 23, and has an approximately similar value in any cases. This is because the mutual inductance M23 becomes smaller (larger) as the mutual inductance M13 becomes larger (smaller), as illustrated in FIG. 15.

As described above, in the power transmission system according to the present embodiment, the magnetic coupling between the first transmitting part 17 (plane coil 14a) and the first receiving part 28, and the magnetic coupling between the second transmitting part 18 (plane coil 14b) and the second receiving part 29 are formed, respectively, so that change of the mutual inductance M between the transmitting coil 14 and the receiving coil 23 is suppressed even if the position gap of the receiving coil 23 is caused.

The power transmission efficiency of the power transmission system depends on the strength of the magnetic coupling between the transmitting coil 14 and the receiving coil 23. Therefore, when the change of the mutual inductance M is suppressed, change of the power transmission efficiency is suppressed. Therefore, in the power transmission system, a decrease in the power transmission efficiency can be suppressed even if the position gap of the receiving coil 23 is caused.

Here, relationship between the position gap of the receiving coil 23 and the mutual inductance M will be described in more detail. Hereinafter, relationship between the magnitude (distance) of the position gap of the receiving coil 23 in a predetermined direction and the mutual inductance M will be described.

Figure 16:
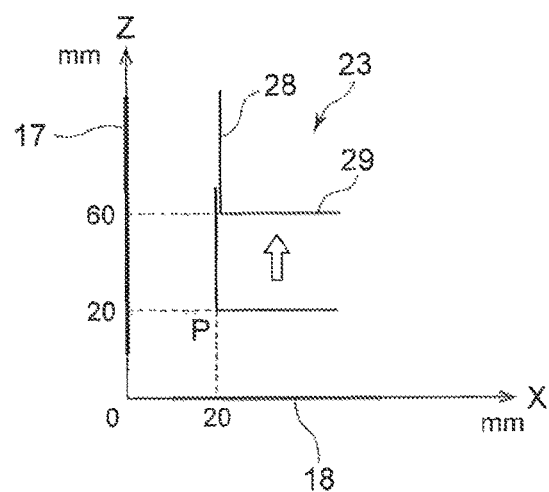
FIG. 16 is an XZ plane cross sectional view of a power transmission system, for describing position gap of a receiving coil.

FIG. 16 is an XZ plane cross sectional view of the power transmission system. In FIG. 16, only the first transmitting part 17, the second transmitting part 18, the first receiving part 28, and the second receiving part 29 are illustrated, and other configurations of the power transmission system are omitted. The XZ plane of FIG. 16 is set such that the X axis passes through the second transmitting part 18, and the Z axis passes through the first transmitting part 17. Further, in FIG. 16, the reference position of the receiving coil 23 is (20, 20), and the magnitude of the first receiving part 28 in the Z direction is 50 mm, the magnitude of the second receiving part 29 in the X direction is 50 mm, and the magnitude of the first receiving part 28 and the second receiving part 29 in the Y direction is the same.

In the description below, the position of the receiving coil 23 is represented by XZ coordinates (X, Z) of a point of intersection P of the first receiving part 28 and the second receiving part 29. Further, the magnitude of the position gap of the receiving coil 23, that is, the distance from the reference position to the point P is referred to as position gap distance.

Figure 17:
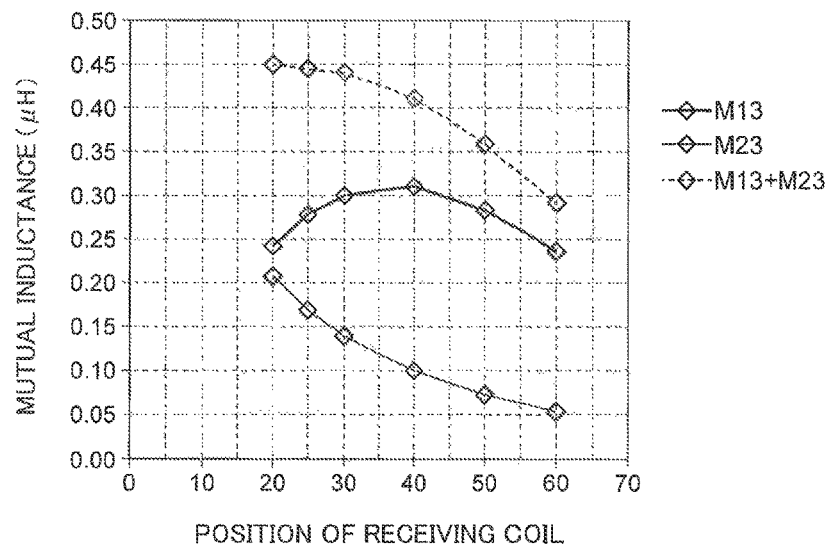
FIG. 17 is a graph illustrating mutual inductances of the power transmission system of FIG. 16.

FIG. 17 is a graph illustrating mutual inductances of when the position of the receiving coil 23 of FIG. 16 in the Z direction is shifted from 20 mm to 60 mm, while the position of the receiving coil 23 in the X direction is remained constant (20 mm). In FIG. 17, the vertical axis represents the mutual inductance, and the horizontal axis represents the position of the receiving coil 23. As described above, the mutual inductance M is approximately equal to M13+M23, and thus hereinafter, M13+M23 will be called mutual inductance M.

As illustrated in FIG. 16, when the position gap distance of the receiving coil 23 becomes large, the distance between the second transmitting part 18 and the second receiving part 29 becomes large. Therefore, the mutual inductance M 23 between the second transmitting part 18 and the second receiving part 29 becomes smaller as the position gap becomes larger, as illustrated in FIG. 17.

In contrast, as illustrated in FIG. 17, the mutual inductance M13 between the first transmitting part 17 and the first receiving part 28 is increased to supplement the decrease in the mutual inductance M23 in a predetermined range (Z≤40 mm) from the reference position (Z=20 mm), and is then decreased. The position gap distance where the mutual inductance M13 is maximized is referred to as maximum position gap distance.

Therefore, as illustrated in FIG. 17, change of the mutual inductance M that is the sum of the mutual inductances M13 and M23 is suppressed in the range from the reference position to the maximum position gap distance. The range where the change of the mutual inductance M is suppressed will be hereinafter referred to as suppression range. That is, the suppression range is a range from the reference position where the position gap distance is 0 to the maximum position gap distance. In the case of FIG. 17, the suppression range is a range where the position gap distance is from 0 to 20 mm, both inclusive. When the receiving coil 23 is arranged in the suppression range, the change of the mutual inductance M is suppressed, and thus the decrease in the power transmission efficiency is suppressed. Therefore, the power transmission can be efficiently performed.

The mutual inductance M and the suppression range are changed according to a facing area (first facing area) $S_1$ of the first transmitting part 17 and the first receiving part 28, and a facing area (second facing area) $S_2$ of the second transmitting part 18 and the second receiving part 29. Therefore, by adjustment of the facing areas $S_1$ and $S_2$, the mutual inductance M and the suppression range can be set to desired values.

Figure 18:
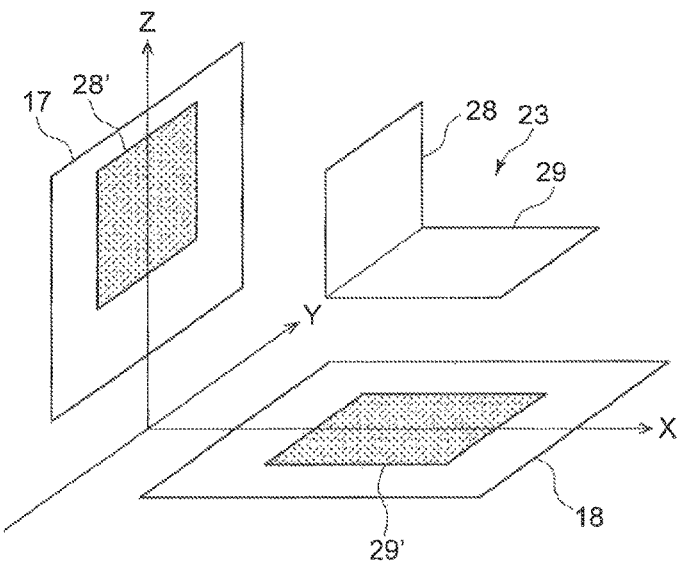
FIG. 18 is a schematic perspective view of a transmitting coil and a receiving coil, for describing a facing area.

The facing area $S_1$ is an area of the orthographic projection of the first receiving part 28 formed on the first transmitting part 17 at the reference position. The orthographic projection referred here is a projection of the first receiving part 28 projected on a plane perpendicular to a principal transmitting direction of the first transmitting part 17 from the principal transmitting direction. As illustrated in FIG. 18, when the first transmitting part 17 has a flat shape, the orthographic projection becomes a projection 28' of the first receiving part 28 projected from the direction perpendicular to the first transmitting part 17. The facing area $S_1$ is an area of the projection 28'.

Figure 19:
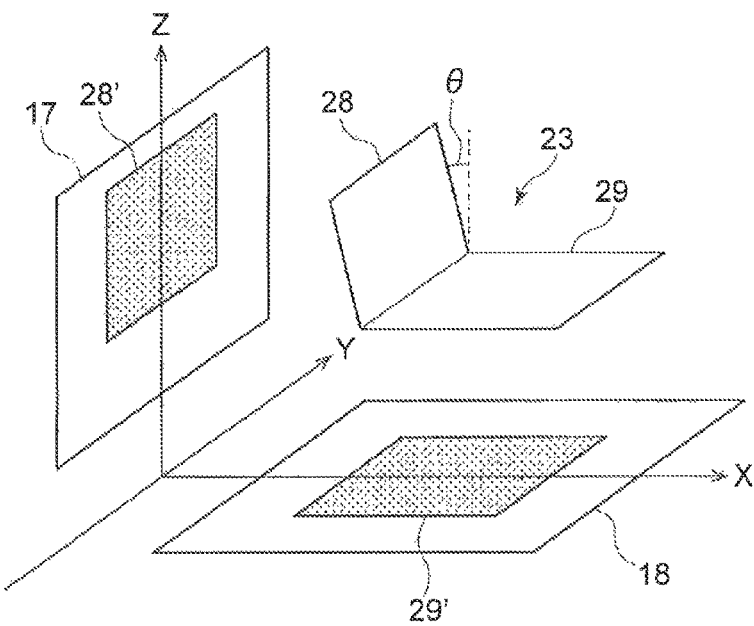
FIG. 19 is a schematic perspective view of a transmitting coil and a receiving coil, for describing a facing area.
Figure 20:
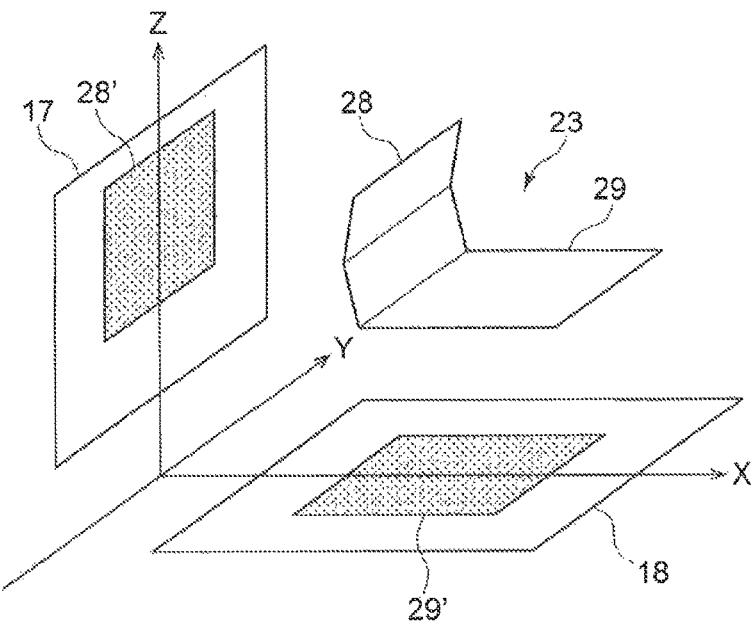
FIG. 20 is a schematic perspective view of a transmitting coil and a receiving coil, for describing a facing area.

The facing area $S_1$ can be set by adjustment of the areas, shapes, and arrangement of the first transmitting part 17 and the first receiving part 28. For example, as illustrated in FIG. 19, the facing area $S_1$ may be set by inclining of the first receiving part 28 with respect to the Z axis by an angle θ. Further, as illustrated in FIG. 20, the facing area $S_1$ may be set by bending of the first receiving part 28. Further, the facing area $S_1$ may be set by inclining or bending of the first transmitting part 17.

The facing area $S_2$ is an area of the orthographic projection of the second receiving part 29 formed on the second transmitting part 18 at the reference position. The orthographic projection referred here is a projection of the second receiving part 29 projected on a plane perpendicular to a principal transmitting direction of the second transmitting part 18 from the principal transmitting direction. As illustrated in FIG. 18, when the second transmitting part 18 has a flat shape, the orthographic projection becomes a projection 29' of the second receiving part 29 projected from the direction perpendicular to the second transmitting part 18. The facing area $S^2$ is an area of the projection 29'.

The facing area $S_2$ can be set by adjustment of the areas, shapes, and arrangement of the second transmitting part 18 and the second receiving part 29. Similarly to the facing area $S_1$, the facing area $S_2$ may be set by inclining or bending of the second transmitting part 18 and the second receiving part 29 with respect to the X axis.

Hereinafter, a method of setting the mutual inductance M and the suppression range with the facing areas $S_1$ and $S_2$ will be described with reference to FIGS. 21 to 23.

Figure 21:
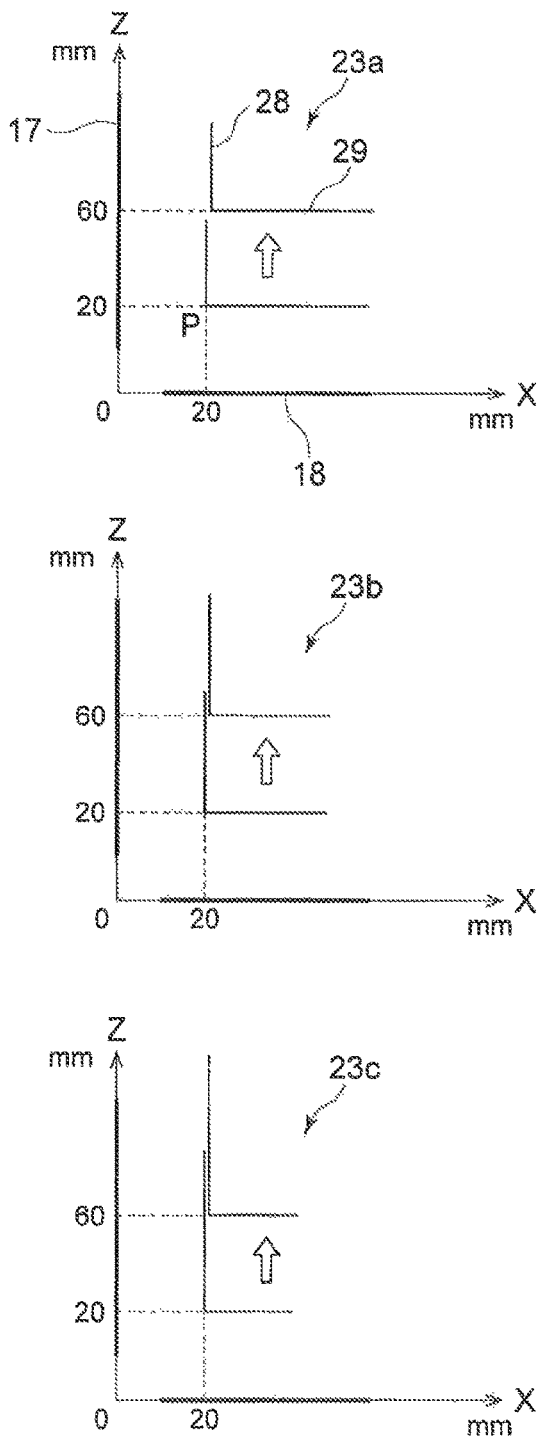
FIG. 21 is an XZ plane cross sectional view of a power transmission system, for describing a method of setting a mutual inductance and a suppression range.

Here, FIG. 21 is an XZ plane cross sectional view of the power transmission system. In FIG. 21, a receiving coil 23a has the magnitude of the first receiving part 28 in the Z direction of 40 mm, and the magnitude of the second receiving part 29 in the X direction of 60 mm. A receiving coil 23b has the magnitude of the first receiving part 28 in the Z direction of 50 mm, and the magnitude of the second receiving part 29 in the X direction of 50 mm. That is, the receiving coil 23b is similar to the receiving coil 23 of FIG. 16. A receiving coil 23c has the magnitude of the first receiving part 28 in the Z direction of 60 mm, and the magnitude of the second receiving part 29 in the X direction of 40 mm. The magnitude of the receiving coils 23a, 23b, and 23c in the Y direction is similar.

In FIG. 21, the transmitting coils 14 are designed such that a ratio of the facing areas $S_1$ of the receiving coils 23a, 23b, and 23c at the reference position becomes 4:5:6, and a ratio of the facing areas $S_2$ becomes 6:5:4.

Figure 22:
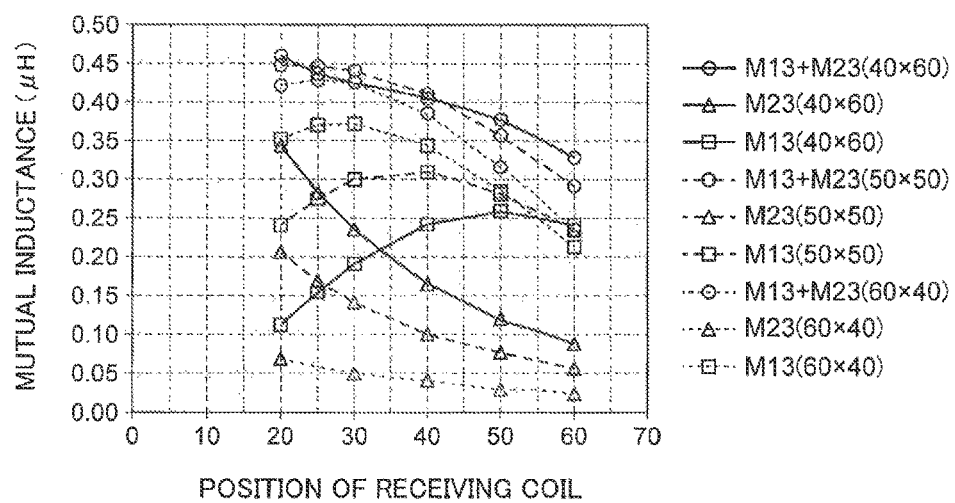
FIG. 22 is a graph illustrating mutual inductances of the power transmission system of FIG. 21.

FIG. 22 is a graph illustrating mutual inductances of when the positions of the receiving coils 23a, 23b, and 23c of FIG. 21 in the Z direction are shifted from 20 mm to 60 mm, while the positions in the X direction are remained constant (20 mm). In FIG. 22, 40×60 indicates the mutual inductance of the receiving coil 23a, 50×50 indicates the mutual inductance of the receiving coil 23b, and 60×40 indicates the mutual inductance of the receiving coil 23c.

First of all, a method of setting the suppression range using the facing area $S_1$ will be described. The magnitude of the facing area $S_1$ correlates with the strength of the magnetic coupling between the first transmitting part 17 and the first receiving part 28. To be specific, as illustrated in FIG. 22, the mutual inductance M 13 becomes smaller as the facing area $S_1$ is smaller, and the mutual inductance M 13 becomes larger as the facing area $S_1$ is larger. Therefore, the mutual inductance M13 of the receiving coil 23a with the minimum facing area $S_1$ is minimized, and the mutual inductance M13 of the receiving coil 23c with the maximum facing area $S_1$ is maximized.

Further, as illustrated in FIG. 22, the magnitude of the facing area $S_1$ correlates with the maximum position gap distance where the mutual inductance M13 is maximized. To be specific, the maximum position gap distance becomes larger as the facing area $S_1$ becomes smaller, and the maximum position gap distance becomes smaller as the facing area $S_1$ is larger. Therefore, the maximum position gap distance of the receiving coil 23a with the minimum facing area $S_1$ is maximized (30 mm), and the maximum position gap distance of the receiving coil 23c with the maximum facing area $S_1$ is minimized (10 mm).

Therefore, by adjustment of the facing area $S_1$, the maximum position gap distance, that is, the suppression range can be set within an arbitrary range. For example, when the position gap of the receiving device 20 of 30 mm or less is expected, the facing area $S_1$ may just be adjusted such that the maximum position gap distance becomes 30 mm. Accordingly, even if the position gap of the receiving device 20 is caused, the decrease in the power transmission efficiency can be suppressed.

FIG. 23 is a table illustrating fluctuation ranges of the mutual inductances M calculated from the graph of FIG. 22. In FIG. 23, a maximum value Mmax, a minimum value Mmin, and a fluctuation range of the mutual inductance M are indicated for each positional range of the receiving device 20. As illustrated in FIG. 23, regarding the fluctuation range of the mutual inductance M, the receiving coil 23a with the minimum facing area $S_1$ has the minimum range. This shows that the suppression range becomes large due to the small facing area $S_1$, as described above, and the decrease in the mutual inductance M is suppressed.

Note that, when the receiving device 20 has the position gap in the X direction, the suppression range may just be set by adjustment of the facing area $S_2$.

Next, a method of setting the mutual inductance M using the facing area $S_2$ will be described. The magnitude of the facing area $S_2$ correlates with the strength of the magnetic coupling between the second transmitting part 18 and the second receiving part 29. To be specific, as illustrated in FIG. 22, the mutual inductance M23 becomes smaller as the facing area $S_2$ is smaller, and the mutual inductance M23 becomes larger as the facing area $S_2$ is larger. Therefore, the mutual inductance M23 of the receiving coil 23a with the maximum facing area $S_2$ is maximized, and the mutual inductance M23 of the receiving coil 23c with the minimum facing area $S_2$ is minimized.

As described above, the mutual inductance M is the sum of the mutual inductance M13 and the mutual inductance M23. Therefore, the mutual inductance M can be set to an arbitrary value by adjustment of either the facing area $S_1$ or $S_2$. However, for example, when the suppression range is set with the facing area $S_1$, the facing area $S_1$ is restricted according to a desired suppression range, and thus it becomes difficult to set the mutual inductance M by adjustment of the facing area $S_1$. Even in such a case, the mutual inductance M can be set to an arbitrary value by adjustment of the facing area $S_2$.

Note that when the position of the receiving device 20 is deviated in the X direction, the mutual inductance M may just be set by adjustment of the facing area $S_1$.

As described above, according to the power transmission system according to the present embodiment, the mutual inductance M and the suppression range can be set to arbitrary values by adjustment of the facing areas $S_1$ and $S_2$. Accordingly, the decrease in the mutual inductance M can be suppressed, and the decrease in the power transmission efficiency can be suppressed.

Further, when the principal position gap direction is determined in advance, it is favorable to set the facing areas $S_1$ and $S_2$ such that the suppression range of the position gap direction becomes large. The principal position gap direction is a direction into which the position gap distance of the receiving device 20 is large, of the X direction and the Z direction.

For example, as illustrated in FIG. 12, when the power transmission is performed in a state where the receiving device 20 is placed on the transmitting device 10, the position gap in the X direction, which is perpendicular to the first transmitting surface 15, is expected to be larger than the position gap in the Z direction, which is perpendicular to the second transmitting surface 16. Therefore, the principal position gap direction can be considered to be the X direction. In such a case, it is favorable to set the facing area $S_1$ to be large and the facing area $S_2$ to be small so that the suppression range in the X direction becomes large. Accordingly, change of the mutual inductance M of when the receiving device 20 is moved in the X direction becomes smaller than change of the mutual inductance M of when the receiving device 20 is moved in the Z direction, and the decrease in the power transmission efficiency due to the position gap in the X direction is suppressed. The decrease in the power transmission efficiency caused by the position gap substantially depends on the position gap in the principal position gap direction. Therefore, by setting of the facing areas $S_1$ and $S_2$ as described above, the decrease in the power transmission efficiency caused by the position gap can be effectively suppressed.

The setting of the facing areas $S_1$ and $S_2$ as described above can be easily realized by, when the receiving coil 23 is formed of one bent or curved plane coil, adjusting the position where the plane coil is bent or curved, so that the area of the second receiving part 29 is made smaller than the area of the first receiving part 28, and the facing area $S_2$ becomes smaller than the facing area $S_1$.

The same applies to the case where the transmitting coil 14 is formed of one bent or curved plane coil. The setting of the facing areas $S_1$ and $S_2$ as described above can be easily realized by adjusting the position where the plane coil is bent or curved is adjusted, so that the area of the second transmitting part 18 becomes smaller than the area of the first transmitting part 17, and the facing area $S_2$ becomes smaller than the facing area $S_1$. Accordingly, the decrease in the power transmission efficiency due to the position gap of the receiving coil 23 can be suppressed.

Note that a configuration of placing the transmitting device 10 on the receiving device 20 and executing the power transmission can also be employed. For example, the transmitting device 10 and the receiving device 20 in FIG. 1 may have opposite shapes.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A power transmission system comprising:
a transmitting device including
   a transmitting housing including a first transmitting surface and a second transmitting surface inclined with respect to the first transmitting surface, and
   a transmitting coil including a first transmitting part arranged in the transmitting housing at a side of the first transmitting surface and a second transmitting part arranged in the transmitting housing at a side of the second transmitting surface; and
a receiving device including
   a receiving housing including a first receiving surface and a second receiving surface inclined with respect to the first receiving surface, and
   a receiving coil including a first receiving part arranged in the receiving housing at a side of the first receiving surface and a second receiving part arranged in the receiving housing at a side of the second receiving surface,
wherein a reference position of the receiving coil with respect to the transmitting coil at a time of power transmission is set such that the first receiving part and the first transmitting part face each other, and the second receiving part and the second transmitting part face each other,
a first facing area between the first receiving part and the first transmitting part at the reference position, and a second facing area between the second receiving part and the second transmitting part at the reference position are set such that change of strength of magnetic coupling between the transmitting coil and the receiving coil of when the receiving device is moved in a direction perpendicular to the first transmitting surface becomes smaller than change of strength of magnetic coupling between the transmitting coil and the receiving coil of when the receiving device is moved in a direction perpendicular to the second transmitting surface, and
when the receiving device moves from the reference position to a maximum position gap distance in a direction perpendicular to the first transmitting surface, strength of magnetic coupling between the second transmitting part and the second receiving part becomes larger and strength of magnetic coupling between the first transmitting part and the first receiving part becomes smaller.

2. The system according to claim 1, wherein the reference position is set such that the first transmitting surface and the first receiving surface are in contact with each other, and the second transmitting surface and the second receiving surface are in contact with each other.

3. The system according to claim 1, wherein at least one of the receiving coil and the transmitting coil is formed of electrically connected two plane coils.

4. The system according to claim 1, wherein at least one of the receiving coil and the transmitting coil is formed of one flat plane coil, one bent plane coil, or one curved plane coil.

5. The system according to claim 1, wherein the first facing area is an area of a projection of the first receiving part formed on the first transmitting part at the reference position.

6. The system according to claim 1, wherein the second facing area is an area of a projection of the second receiving part formed on the second transmitting part at the reference position.

7. The system according to claim 1, wherein the strength of magnetic coupling is a mutual inductance or a coupling coefficient between the receiving coil and the transmitting coil.

8. A receiving device comprising:
a receiving housing including a first receiving surface and a second receiving surface inclined with respect to the first receiving surface; and
a receiving coil including a first receiving part arranged in the receiving housing at a side of the first receiving surface and a second receiving part arranged in the receiving housing at a side of the second receiving surface,
wherein the receiving device performs power transmission with a transmitting device including a transmitting housing including a first transmitting surface and a second transmitting surface inclined with respect to the first transmitting surface, and a transmitting coil including a first transmitting part arranged in the transmitting housing at a side of the first transmitting surface and a second transmitting part arranged in the transmitting housing at a side of the second transmitting surface; and
wherein a reference position of the receiving coil with respect to the transmitting coil at a time of power transmission is set such that the first receiving part and the first transmitting part face each other, and the second receiving part and the second transmitting part face each other,
a first facing area between the first receiving part and the first transmitting part at the reference position, and a second facing area between the second receiving part and the second transmitting part at the reference position are set such that change of strength of magnetic coupling between the transmitting coil and the receiving coil of when the receiving device is moved in a direction perpendicular to the first transmitting surface becomes smaller than change of strength of magnetic coupling between the transmitting coil and the receiving coil of when the receiving device is moved in a direction perpendicular to the second transmitting surface, and
when the receiving device moves from the reference position to a maximum position gap distance in a direction perpendicular to the first transmitting surface, strength of magnetic coupling between the second transmitting part and the second receiving part becomes larger and strength of magnetic coupling between the first transmitting part and the first receiving part becomes smaller.

9. The device according to claim 8, wherein the receiving coil is formed of electrically connected two plane coils.

10. The device according to claim 8, wherein the receiving coil is formed of one flat plane coil, one bent plane coil, or one curved plane coil.

11. A transmitting device comprising:
- a transmitting housing including a first transmitting surface and a second transmitting surface inclined with respect to the first transmitting surface; and
- a transmitting coil including a first transmitting part arranged in the transmitting housing at a side of the first transmitting surface and a second transmitting part arranged in the transmitting housing at a side of the second transmitting surface,
- wherein the transmitting device performs power transmission with a receiving device including a receiving housing including a first receiving surface and a second receiving surface inclined with respect to the first receiving surface, and a receiving coil including a first receiving part arranged in the receiving housing at a side of the first receiving surface and a second receiving part arranged in the receiving housing at a side of the second receiving surface,
- wherein a reference position of the receiving coil with respect to the transmitting coil at a time of power transmission is set such that the first receiving part and the first transmitting part face each other, and the second receiving part and the second transmitting part face each other,
- a first facing area between the first receiving part and the first transmitting part at the reference position, and a second facing area between the second receiving part and the second transmitting part at the reference position are set such that change of strength of magnetic coupling between the transmitting coil and the receiving coil of when the receiving device is moved in a direction perpendicular to the first transmitting surface becomes smaller than change of strength of magnetic coupling between the transmitting coil and the receiving coil of when the receiving device is moved in a direction perpendicular to the second transmitting surface, and
- when the receiving device moves from the reference position to a maximum position gap distance in a direction perpendicular to the first transmitting surface, strength of magnetic coupling between the second transmitting part and the second receiving part becomes larger and strength of magnetic coupling between the first transmitting part and the first receiving part becomes smaller.

12. The device according to claim 11, wherein the transmitting coil is formed of electrically connected two plane coils.

13. The device according to claim 11, wherein the transmitting coil is formed of one flat plane coil, one bent plane coil, or one curved plane coil.

* * * * *